(12) United States Patent
Fleury

(10) Patent No.: US 9,079,532 B2
(45) Date of Patent: Jul. 14, 2015

(54) DEVICE FOR NIGHTTIME MOTOR VEHICLE DRIVING ASSISTANCE

(71) Applicant: Valeo Vision, Bobigny Cedex (FR)

(72) Inventor: Benoist Fleury, Vincennes (FR)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 14/385,646

(22) PCT Filed: Mar. 22, 2013

(86) PCT No.: PCT/EP2013/056035
§ 371 (c)(1),
(2) Date: Sep. 16, 2014

(87) PCT Pub. No.: WO2013/143998
PCT Pub. Date: Oct. 3, 2013

(65) Prior Publication Data
US 2015/0088385 A1    Mar. 26, 2015

(30) Foreign Application Priority Data

Mar. 26, 2012 (FR) .................... 12 52672

(51) Int. Cl.
*B60R 22/00* (2006.01)
*B60Q 1/14* (2006.01)
(Continued)

(52) U.S. Cl.
CPC . *B60Q 1/143* (2013.01); *B60J 3/04* (2013.01); *B60Q 1/085* (2013.01); *B60Q 2300/31* (2013.01)

(58) Field of Classification Search
USPC .............. 701/48; 362/510, 520, 521, 326; 349/113
See application file for complete search history.

(56) References Cited

U.S. PATENT DOCUMENTS 5,258,607 A    11/1993 Agostini et al.
5,486,938 A *  1/1996 Aigrain ................ 349/116
(Continued)

FOREIGN PATENT DOCUMENTS

DE    3836095 A1    4/1990
EP    0498143 A1    8/1992
(Continued)

OTHER PUBLICATIONS

Night time vehicle detection for driving assistance lightbeam controller; Alcantarilla, P.F. ; Bergasa, L.M. ; Jiménez, P. ; Sotelo, M.A. ; Parra, I. ; Fernandez, D. ; Mayoral, S.S.; Intelligent Vehicles Symposium, 2008 IEEE; DOI: 10.1109/IVS.2008.4621142 Publication Year: 2008 , pp. 291-296.*
(Continued)

*Primary Examiner* — Cuong H Nguyen
(74) *Attorney, Agent, or Firm* — Jacox, Meckstroth & Jenkins

(57) ABSTRACT

A device for assisting the nighttime driving of a motor vehicle fitted with a lighting device for emitting a beam for illuminating the road scene in front of the vehicle, the illumination emitted by the lighting device being variable periodically between a maximum value and a minimum value, the device including at least one variable-transmission screen placed between the road scene and the driver, the coefficient of transmission of the screen being variable periodically between a maximum value and a minimum value, the switching on of at least one light source of the lighting device and the coefficient of transmission of the variable-transmission screen controlled by the control unit, the illumination reaching its maximum value when the coefficient of transmission of the screen reaches its maximum value. The control unit controls a circuit for regulating the power supply and a transmitter of remote control waves toward a receiver.

20 Claims, 4 Drawing Sheets

(51) Int. Cl.
*B60Q 1/08* (2006.01)
*B60J 3/04* (2006.01)

(56) References Cited

U.S. PATENT DOCUMENTS

| | | | |
|---|---|---|---|
| 5,835,458 A * | 11/1998 | Bischel et al. | 369/44.12 |
| 5,911,018 A * | 6/1999 | Bischel et al. | 385/16 |
| 5,978,524 A * | 11/1999 | Bischel et al. | 385/4 |
| 6,078,704 A * | 6/2000 | Bischel et al. | 385/4 |
| 6,118,908 A * | 9/2000 | Bischel et al. | 385/14 |
| 6,133,686 A * | 10/2000 | Inoue et al. | 313/477 R |
| 6,141,465 A * | 10/2000 | Bischel et al. | 385/4 |
| 6,522,794 B1 * | 2/2003 | Bischel et al. | 385/4 |
| 6,624,564 B2 * | 9/2003 | Wang et al. | 313/479 |
| 8,197,931 B2 * | 6/2012 | Ueda et al. | 428/317.9 |
| 8,208,504 B2 * | 6/2012 | Dantus et al. | 372/22 |
| 2002/0175615 A1 * | 11/2002 | Wang et al. | 313/479 |

FOREIGN PATENT DOCUMENTS

| | | |
|---|---|---|
| FR | 2846756 A1 | 5/2004 |
| WO | WO 9214625 A1 * | 9/1992 |
| WO | 9512502 A1 | 5/1995 |
| WO | 9620846 A1 | 7/1996 |

OTHER PUBLICATIONS

The measurement of optical attenuation in sea water; Aiken, J. ; Hudson, S.J. ; Vessey, J.P.; OCEANS '94. 'Oceans Engineering for Today's Technology and Tomorrow's Preservation.' Proceedings; vol. 2; DOI: 10.1109/OCEANS.1994.364129 Publication Year: 1994 , pp. II/689-II/693 vol. 2.*

A novel fuzzy method to traffic light control based on unidirectional selective cellular automata for urban traffic; Shakeri, M. ; Deldari, H. ; Rezvanian, A. ; Foroughi, H.; Computer and Information Technology, 2008. ICCIT 2008. 11th International Conference on; DOI: 10.1109/ICCITECHN.2008.4803071; Publication Year: 2008 , pp. 300-305.*

Mobile Standards-Based Traffic Light Detection in Assistive Devices for Individuals with Color-Vision Deficiency; Almagambetov, A. ; Velipasalar, S. ; Baitassova, A.; Intelligent Transportation Systems, IEEE Transactions on; vol. PP , Issue: 99 DOI: 10.1109/TITS.2014.2361139; Publication Year: 2014 , pp. 1-16.*

* cited by examiner

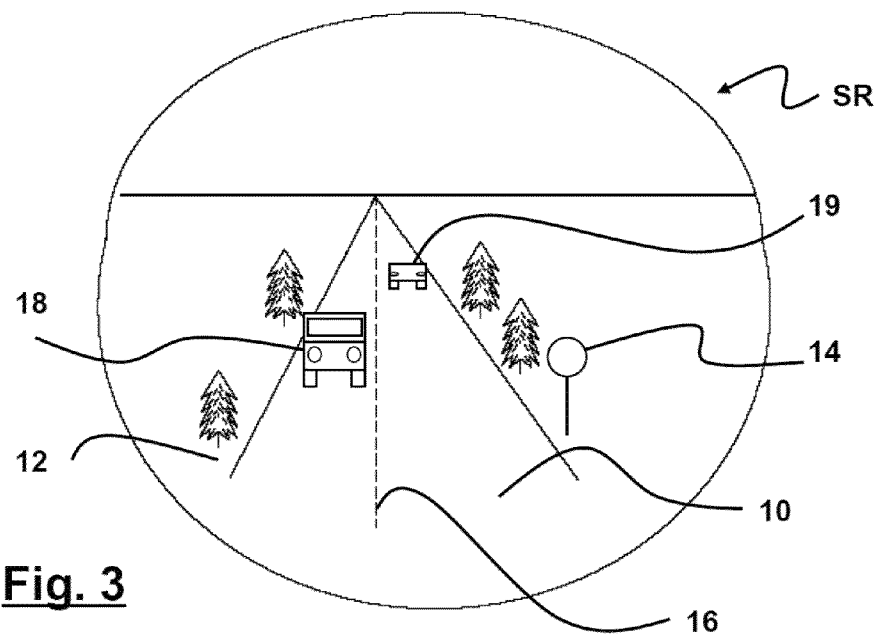
Fig. 3
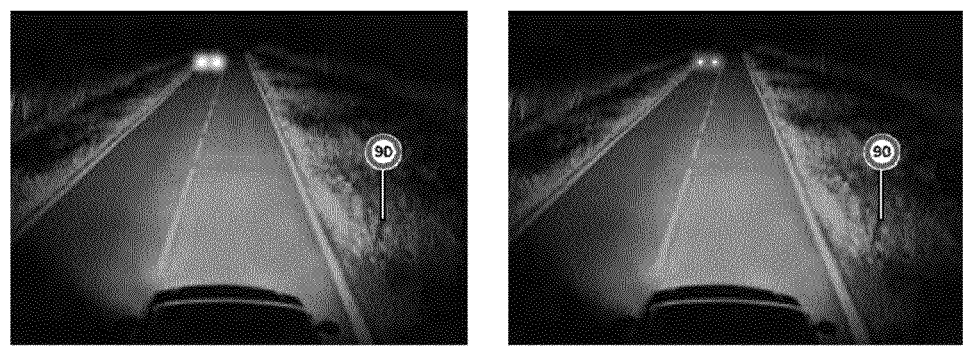
Fig. 4  A    B

DEVICE FOR NIGHTTIME MOTOR VEHICLE DRIVING ASSISTANCE

CROSS-REFERENCE TO RELATED APPLICATIONS

This application is the U.S. National Phase application of PCT/EP2013/056035 filed Mar. 22, 2013, which claims priority to French Application No. 1252672 filed Mar. 26, 2012, which applications are incorporated herein by reference and made a part hereof.

BACKGROUND OF THE INVENTION

1. Field of the Invention

The present invention relates to methods and devices intended to provide assistance in the driving of motor vehicles, particularly when the external brightness is low, making it necessary to switch on low beam headlights (also called "statutory" lights).

2. Description the Related Art

The light beams emitted by lighting devices fitted to vehicles are governed by international regulations which specify the maximum and minimum intensities to be used, for example as they appear on a screen placed at a distance from and in the axis of the lighting devices. In the specific case of low beam headlights, the aim of these regulations is simultaneously

- to enable the driver of the vehicle fitted with this lighting device to have a satisfactory illumination of the road scene on which he is traveling, so that he can perceive his environment in the best possible conditions, and
- to avoid dazzling the drivers of other vehicles, regardless of whether they are traveling in the opposite direction (approaching vehicles) or in the same direction (followed vehicles).

If the low beam headlights of an approaching vehicle are switched on and the headlights emitting the low beam are poorly adjusted or even slightly out of adjustment, this will be enough to cause dazzling, since the low beam of the approaching vehicle will include light rays higher than an upper regulatory limit called the cut-off level, these rays being prohibited by the regulations.

Moreover, even if the lighting devices of the approaching vehicles are correctly adjusted, the emitted beam may still cause dazzling if the outer lenses of these devices, through which the light rays pass, are soiled. This is because any soiling present on the outer lens forms centers of light diffusion, that is to say secondary light sources, which emit light in all directions. The greater the soiling of the outer lens, the greater is the tendency for the lighting device to emit a dazzling beam.

The low beam headlights of approaching vehicles may also be dazzling in another situation, in which the rear trunks of these vehicles contain relatively heavy luggage. In this case, the attitude of the vehicle is changed and ceases to be horizontal, the front of the vehicle being raised. Manually or automatically operated correctors are normally provided to lower the light beam to bring it back into conformity with the regulations. If the corrector has not been operated or if it is faulty, the low beam will include light rays located above the upper regulatory limit, these rays causing dazzling and being prohibited by the regulations.

These risks of dazzling by a vehicle approaching in the opposite direction are increased if the vehicle is a heavy goods vehicle, the headlights of which are generally fitted higher up than those of light vehicles.

Various solutions have been proposed to mitigate this situation.

For example, the document FR 2 846 756 discloses a method for improving the night vision of drivers, including a first polarizing filter in the vicinity of the light sources and a second polarizing filter having a polarization direction perpendicular to that of the first filter, in the field of view of the drivers.

This solution is theoretically satisfactory, but in order to be effective it would require all motor vehicles on the road to be fitted with polarizing filters on the protective outer lenses of their lighting devices, and would also require the driver to be provided with polarizing glasses.

Additionally, EP 0 498 143 A1, which is equivalent to U.S. Pat. No. 5,258,607, discloses an anti-dazzle device including an optical sensor supplying a proportional signal at the value of the ambient brightness within a predetermined measurement angle. The sensor transmits this signal to a circuit for measurement and comparison with a predetermined threshold value. If the measured value exceeds the predetermined value, the comparison circuit sends a signal for switching on an electrosensitive screen which is designed to change from a state of total transparency in the absence of a signal to a partially transparent or colored state when the signal is transmitted, and then to return to the transparent state when the signal ceases.

The drawback of this device is that it affects the perception of the whole road scene. If the ambient brightness exceeds the authorized threshold, the whole road scene will be obscured, although the excess brightness may be created by only one element forming a single point in the road scene. In this case, a driver provided with this anti-dazzle device may fail to see certain important elements in the road scene, such as a traffic sign warning of an imminent hazard, or the road surface illuminated by his own headlight beam.

There is a known method and device, for example that disclosed in WO 96/20846, for attenuating the light from the headlights of approaching vehicles, comprising the emission of light pulses by the vehicle headlights and the control of the transparency of filters placed before the driver's eyes in synchronization with the light pulses emitted by the headlights of the vehicle, the transparency of the filters being at a maximum for a duration exceeding that of the light pulses. In this way the brightness of oncoming headlights is reduced.

U.S. Pat. No. 5,486,938 also discloses an anti-dazzle system for drivers, comprising a generator which controls, in a synchronized manner, headlights fitted with flashlamps and a liquid crystal screen, placed before the driver's eyes, in such a way that the transmission of the screen is maximal during the emission of the light pulses.

The last two of these documents describe systems which are cumbersome and difficult to use, which are relatively slow in operation with relatively long response times, and in which the transparency of the filters or screens used is always less than 50%; that is to say, these systems, using liquid crystals, cause a decrease in the perceived luminous intensity, even when their transmission is maximal.

SUMMARY OF THE INVENTION

The present invention lies within this context, and proposes a method and a device enabling a vehicle driver to avoid being dazzled by approaching vehicles whose low beams become dazzling, notably in one of the aforementioned situations.

The present invention lies within this context and has the object of providing assistance in the nighttime driving of a motor vehicle, by providing the driver of the vehicle with:

a comprehensive view of the road scene as it is illuminated by the lighting devices of his vehicle, and an attenuated view of light sources which are present in the road scene and which do not belong to the vehicle controlled by the driver, and which might interfere with his perception of the road scene, without thereby impeding the driver's movements or restricting his field of view.

To this end, the present invention proposes a device for assistance in the nighttime driving of a motor vehicle, the vehicle being fitted with at least one lighting device for emitting a beam for the illumination of the road scene in front of the vehicle in accordance with regulations, the illumination emitted by the lighting device being variable between a maximum value and a minimum value, the device including at least one variable-transmission screen placed between the road scene and the driver of the vehicle, the coefficient of transmission of the screen being variable between a maximum value and a minimum value, the switching on of at least one light source of the lighting device and the coefficient of transmission of the variable-transmission screen being controlled by the same control unit in synchronization, and the illumination reaching its maximum value substantially when the coefficient of transmission of the screen reaches its maximum value.

According to the invention, the control unit controls a circuit for regulating the power supply to the light source of the lighting device and a transmitter of remote control waves directed toward a receiver.

According to other characteristics of the invention, considered separately or in combination:

the coefficient of transmission of the variable-transmission screen is controlled by a receiver receiving the remote control waves transmitted by the transmitter of the remote control waves;

the variable-transmission screen is formed by:
 the windshield of the vehicle,
 a screen placed between the windshield of the vehicle and the driver of the vehicle, or
 glasses worn by the driver of the vehicle.

the control unit controls:
 the circuit for regulating the power supply to the light source of the lighting device, and
 the transmitter of remote control waves directed toward the receiver,
in such a way that the variations of the illumination emitted by the lighting device and of the coefficient of transmission of the variable-transmission screen are synchronized, and reach their maximum values at the same time;

the control unit operates:
 the circuit for regulating the power supply to the light source of the lighting device, and
 the transmitter of remote control waves directed toward the receiver,
in such a way that the duration for which the coefficient of transmission has its maximum value is greater than the duration for which the illumination has its maximum value;

the illumination emitted by the lighting device and the coefficient of transmission of the variable-transmission screen are variable according to a pulse width modulation mode;

the minimum value of the illumination is zero;

the minimum value of the coefficient of transmission of the variable-transmission screen is substantially zero;

the transmitter of remote control waves and the receiver of these remote control waves communicate by means of radio, infrared or ultrasonic waves;

the transmitter of remote control waves and the receiver of these remote control waves communicate according to a wireless communication protocol;

the light source of the lighting device is a light-emitting diode or a laser diode, the light source being supplied with power by a regulating circuit, and receiving electrical power which varies periodically between a maximum and a minimum value;

the electrical power is variable according to a pulse width modulation mode;

the variable-transmission screen is formed by a liquid crystal screen;

the variable-transmission screen is formed by a microelectromechanical system;

the variable-transmission screen is associated with a stand-alone electrical power supply;

the coefficient of transmission of the variable-transmission screen is controlled in synchronization with luminous visual displays presented by the vehicle dashboard and relating to the operation or the environment of the vehicle;

the brightness of the visual displays is increased by a factor equal to the inverse of the duty cycle of the pulse width modulation mode when the coefficient of transmission of the variable-transmission screen is at its maximum value;

the coefficient of transmission of the variable-transmission screen is controlled in synchronization with the interior lighting of the vehicle, the interior lighting being switched on only when the coefficient of transmission of the variable-transmission screen is at its minimum value.

The invention also proposes a variable-transmission screen adapted to be placed between the driver of a motor vehicle and the road scene in front of the vehicle.

According to the invention, the coefficient of transmission of the screen is variable according to a pulse width modulation mode between a maximum value and a minimum value, the coefficient of transmission of the variable-transmission screen being controlled by a control unit according to a wireless communication protocol, by means of remote control waves transmitted by a transmitter of the control unit and received by a receiver.

Other objects, characteristics and advantages of the present invention will be apparent from the following description of an exemplary embodiment, provided on a nonlimiting basis with reference to the attached drawings, in which

BRIEF DESCRIPTION OF THE ACCOMPANYING DRAWINGS

FIG. 3 shows schematically a road scene as observed by a driver of a vehicle,

Figure 1:
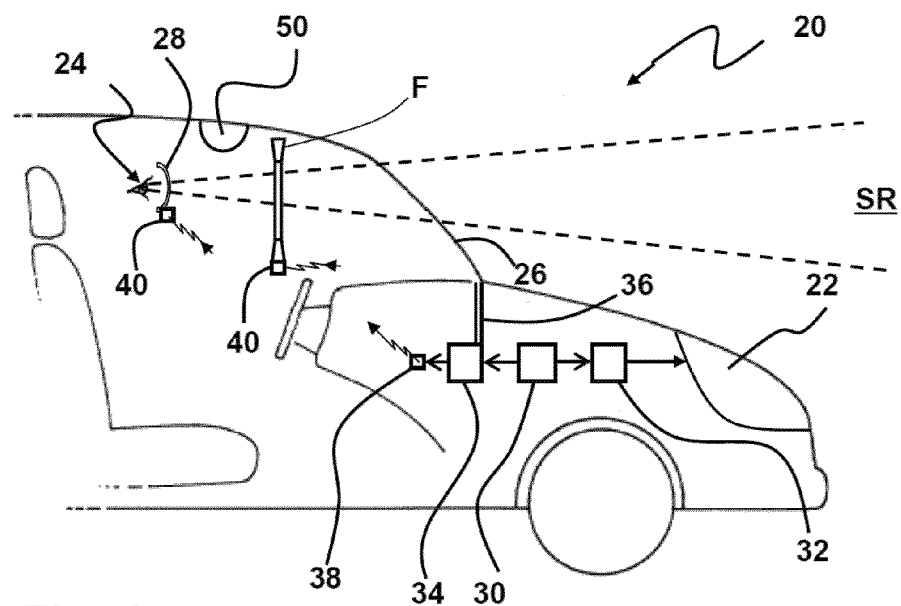
FIG. 1 shows schematically, in partial section, a vehicle fitted with a device according to the present invention.
Figure 5:
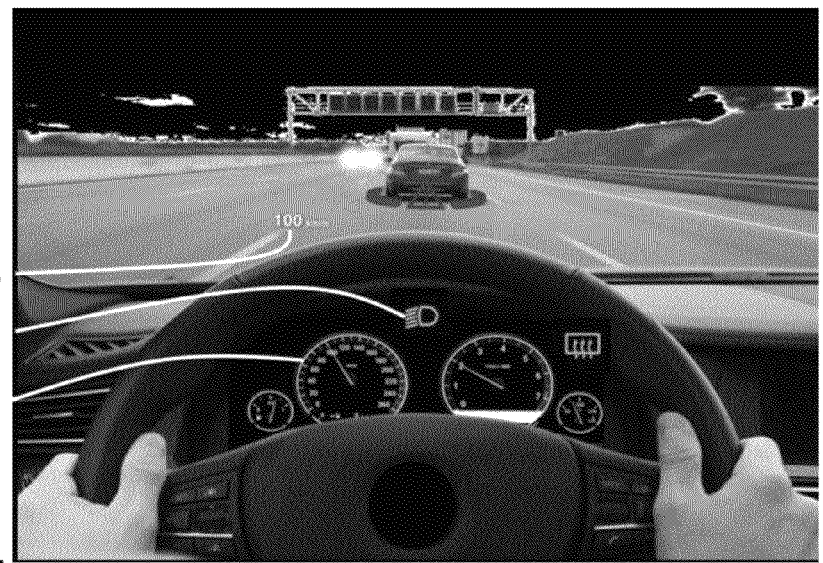
Figure 6:
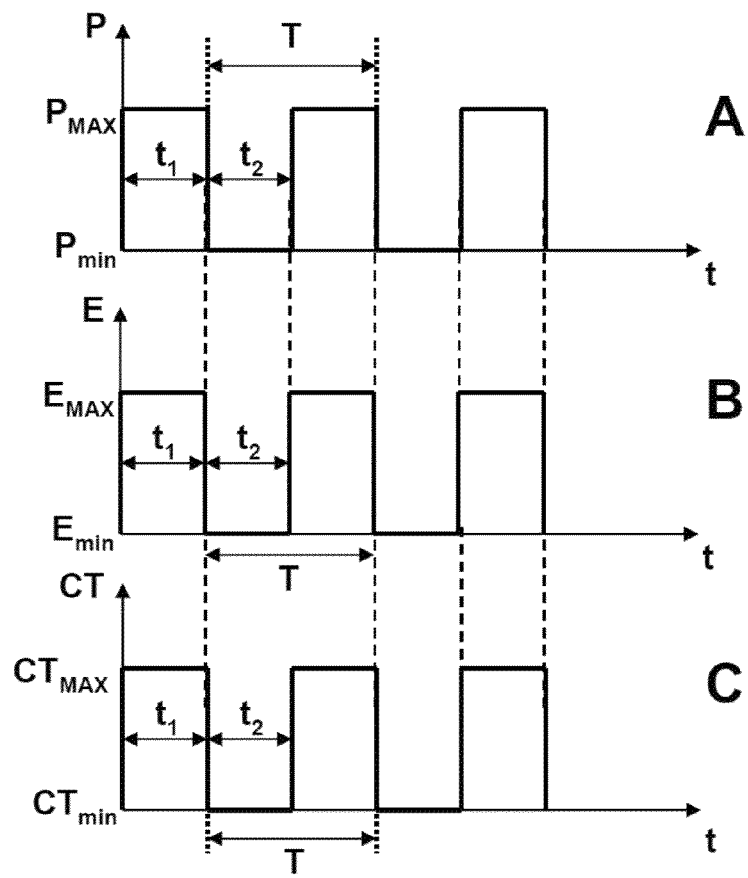

FIGS. 4A and 4B show a road scene as observed by the driver of the vehicle shown in FIG. 1; FIG. 4A shows the scene without the device according to the present invention, while in FIG. 4B the vehicle is fitted with the device according to the present invention, FIG. 5 shows the average field of view of a vehicle driver, In the diagrams in FIG. 6, FIG. 6A shows the variation over time of the electrical power supplied to the light sources of the headlights of the vehicle of FIG. 1, while FIG. 6B shows the variation over time of the luminous intensity emitted by these headlights, and FIG. 6C shows the variation over time of the coefficient of transmission of a variable-transmission screen.

FIGS. 7A and 7B show variants of FIGS. 6B and 6C respectively, FIG. 7A being a diagram of the variation over time of the luminous intensity emitted by the headlights, and FIG. 7B being a diagram of the variation over time of the coefficient of transmission of a variable-transmission screen.

DETAILED DESCRIPTION OF THE PREFERRED EMBODIMENTS

With reference to FIG. 3 initially, a road scene SR is shown schematically as it may be perceived by a driver 24 in a regular driving situation. FIGS. 4A, 4B and 5 show views of this road scene SR, in nighttime driving, after the low beam headlights have been switched on.

The road scene SR typically includes, in addition to the road 10 itself, roadside elements such as structures or, as in the example shown, road shoulders and trees, traffic signs and other vehicles, followed or approaching.

Thus the elements visible in a road scene illuminated by the low beam headlights of a vehicle can be classified into several categories:

passive elements or passive sources, such as elements of the landscape, for example the road 10, the shoulders and trees 12, adjacent structures, and the like, that is to say the elements that receive the light emitted by the headlights of the vehicle, and that diffuse in all directions equally, or, in other words, that have only an induced brightness, in that the more they are illuminated, the brighter they are;

semi-active elements or semi-active sources, such as traffic signs 14, fluorescent marking lines 16 on the roadway, reflectors of other vehicles that are followed (traveling in the same direction) 19, and the like, that is to say elements that receive the light emitted by the headlights of the vehicle and that reflect a notable part of this light in a preferred direction, generally approximately in the direction from which it came; in other words, these elements also have only an induced brightness, but this brightness is greater than that of the passive elements, active elements or active sources, such as the lighting devices or headlights 18 of other approaching vehicles (those moving in the opposite direction), three-color traffic signal lights, street lights, and the like, that is to say elements that are light sources themselves and that emit light by themselves, independently of the illumination that they receive; in other words, these elements have an intrinsic brightness, regardless of the illumination that they receive.

Thus all the elements of the road scene are perceived by a driver with a brightness that is the sum of:

their intrinsic brightness, which is zero for passive and semi-active elements, and their induced brightness, which is negligible for active elements.

Thus, in the road scene of FIG. 3, the following can be seen:

passive sources such as the road 10, the shoulders and the trees 12, semi-active sources such as the traffic sign 14, the marking lines 16 on the roadway and the reflectors 19, and active sources such as the headlights 18 of a vehicle approaching in the opposite direction.

As a general rule, passive and semi-actives do not give rise to unacceptable problems of dazzling, since traffic signs with a large surface area which might create this kind of inconvenience are generally located away from the immediate proximity of the road.

Therefore, the problems of dazzling arise solely from active elements such as the headlights 18 of vehicles traveling in the opposite direction, for the various reasons explained in the introduction above.

The present invention proposes a solution to this problem by reducing the brightness of active elements which are potential sources of dazzle, but without changing the brightness of passive or semi-active elements which may be important for safety. For this purpose, the invention proposes to provide a selective screen interposed between the driver and the road scene, this screen filtering the light rays from active sources so as to attenuate them, and being transparent to the light rays from passive or semi-active sources.

FIG. 1 shows schematically a partial section through a vehicle indicated as a whole by the reference 20, fitted with headlights 22 in a conventional way, and controlled by a driver 24, indicated symbolically by the driver's eye 24.

The driver 24 observes the road scene SR in front of the vehicle 20, as it is shown schematically in FIG. 3, through the windshield 26.

According to the present invention, a variable-transmission screen is placed in the field of view of the driver 24, between the latter and the road scene SR, for the purpose of on the one hand, filtering the potentially dazzling light rays from active sources, so as to attenuate them, and on the other hand, allowing the passage of all the light rays from passive and semi-active sources, so as not to occult the safety information carried on them.

According to the embodiments of the invention, the variable-transmission screen may be formed by:

a screen F properly so-called, which is placed between the driver 24 and the windshield 26, and which can be folded back like a sun visor, the windshield 26 itself, or a pair of glasses 28, worn by the driver 24 like sunglasses or corrective spectacles, only one lens of the glasses 28 being shown in FIG. 1.

These three embodiments have been shown simultaneously in FIG. 1 for ease of description. However, they are only variant embodiments, each of which tends to provide the same result.

In the rest of the description, the term "variable-transmission screen" will be used to denote any of:

the screen F, regardless of whether it is fixed or of the foldable sun visor type;

the windshield 26, or a pair of glasses 28.

Regardless of the embodiment, according to the present invention, the coefficient of transmission of the variable-transmission screen F is controlled in synchronization with the operation of the headlights 22 of the vehicle 20.

According to the present invention, the headlights 22 emit a light beam of variable intensity, the variation of the intensity of the low beam emitted by the headlights 22 being synchronized with the variation of the coefficient of transmission of the variable-transmission screen F.

In other words, the maximum levels of luminous intensity emitted by the headlights 22 coincide with the maximum levels of the coefficient of transmission of the variable-transmission screen F, and the minimum levels of light intensity emitted by the headlights 22 coincide with the minimum levels of the coefficient of transmission of the variable-transmission screen F.

Thus the driver's 24 perception of the road scene SR through the variable-transmission screen F is optimal when the latter is illuminated with the maximum light intensity.

In order to achieve this object, the invention provides for a control unit 30 which operates:

a regulating circuit or driver 32 for supplying the light sources of the headlights 22, and a circuit 34 for controlling the coefficient of transmission for the variable-transmission screen F.

The operation carried out by the control unit 30 is such that:

the regulating circuit 32 causes the light sources of the headlights 22 to be supplied in such a way that the headlights 22 emit a light beam having a periodically variable intensity, between a maximum value and a minimum value, and the circuit 34 controls the coefficient of transmission of the variable-transmission screen F so that the latter changes periodically from a maximum transparency to a minimum transparency, and the circuits 32 and 34 are controlled in a synchronized manner, the intensity emitted by the headlights 22 being maximal at the time when the transparency of the variable-transmission screen F is maximal, and vice versa, the intensity emitted by the headlights 22 being minimal at the time when the transparency of the variable-transmission screen F is minimal.

Since the illumination provided by the headlights 22 is variable, the light sources fitted to these headlights 22 should not have an excessive inertia; in other words, the emitted luminous power should be a direct function of the electrical power received by them. Incandescent lamps, as well as discharge lamps, do not meet this condition, having a response time which is unsuitable for resolving the problem of the present invention, and therefore the invention provides for the use of diodes for the light sources of the headlights 22.

These diodes may take the form of light-emitting diodes, also called LEDs, which emit white light, such as those fitted to the headlights of modern vehicles. They may also take the form of laser diodes, in which the ray strikes a phosphor layer which in turn emits white light.

Depending on the type of diodes used, or the design of the headlights 22, the light sources of the headlights 22 may be formed by one or more of these diodes.

The reaction of these diodes, in terms of light emission, to any variation in their power supply is virtually instantaneous, so that they allow precise control of the illumination of the road scene SR in front of the vehicle 20, and this illumination can therefore be made periodically variable at a relatively high frequency.

Similarly, the variable-transmission screen F may be designed to have a very short response time and to allow a fast variation of its coefficient of transmission.

To this end, the variable-transmission screen F may be formed by a liquid crystal screen, which provides such fast reaction times. The variable-transmission screen F may also take the form of a microelectromechanical system, such as one of the type described in U.S. Pat. No. 7,684,105.

If the variable-transmission screen F is fixed, as in the case of the windshield 26, it can be connected directly to the vehicle's wiring harness to provide its power supply, and can be connected directly to the circuit 34 for controlling the coefficient of transmission. This double supply of electrical power and control signals is represented in FIG. 1 by the double link 36.

If the variable-transmission screen F is movable, as in the case of the screen F of the sun visor type or the pair of glasses 28, it may have its own power supply. In fact, the control of the state of transparency, or of the coefficient of transmission, of a liquid crystal screen or a microelectromechanical system requires only minimal electrical power, so that batteries such as button cells are sufficient to provide correct operation of the liquid crystal screen or of a microelectromechanical system for a considerable length of time, especially in the case of the glasses 28. The term "microelectromechanical" is used in the present description to describe the concept known from the English acronym MEMS (standing for "MicroElectroMechanical System").

Additionally, for a movable variable-transmission screen F, the control of its coefficient of transmission by the circuit 34 can be made to take place by a wireless method, for example by means of radio, infrared or ultrasonic waves according to a wireless communication protocol, for example according to Bluetooth or Wi-Fi (registered trademarks) standards. These waves are referred to in the rest of the description as "remote control waves". In this case the circuit 34 includes a transmitter 38 of remote control waves, and the variable-transmission screen F or the glasses 28 are provided with a receiver 40 of these remote control waves.

The operation of the system described above can easily be deduced from the foregoing explanations.

Figure 2:
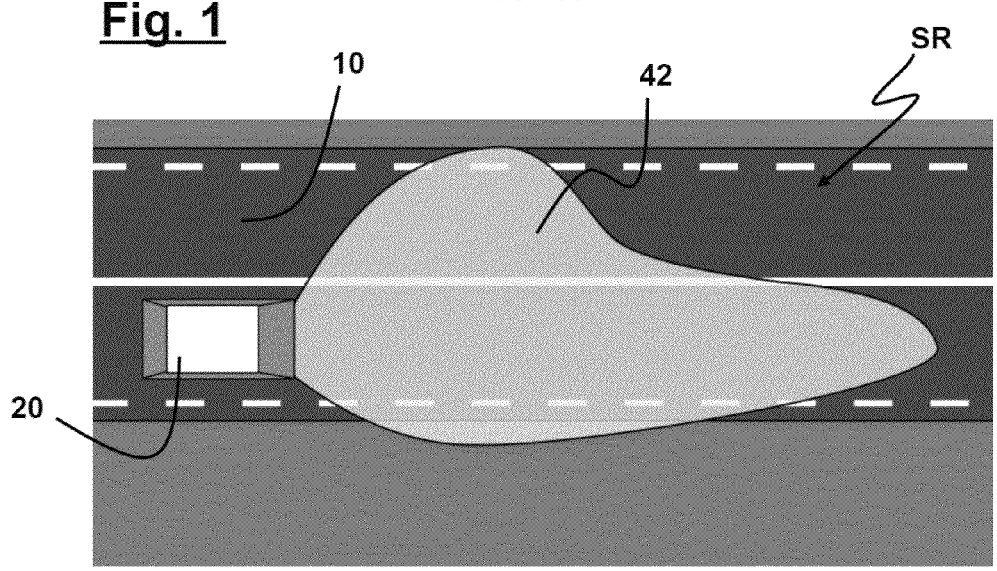
FIG. 2 shows schematically, in a view from above, a low beam according to regulations emitted by a vehicle.

If, as a result of a reduction in the ambient brightness, the light sources of the headlights 22 are switched on, manually by the driver 24 or automatically by an ambient brightness sensor, in order to emit a low light beam, that is to say a beam 42 as shown in FIG. 2 in a view from above, the control unit 30 controls the regulating circuit 32 so that the light sources of the headlights 22 are supplied periodically, according to the diagram in FIG. 6.

The light sources of the headlights 22 therefore receive an electrical power P variable periodically between a maximum value $P_{MAX}$ and a minimum value $P_{min}$, for example in PWM (standing for the English expression "Pulse Width Modulation") mode, at a predetermined frequency and with a predetermined duty cycle, according to the diagram in FIG. 6A.

The light sources, taking the form of diodes, LEDs or laser diodes, similarly emit an illumination E varying periodically between maximum illumination $E_{MAX}$ and minimum illumination $E_{min}$, at the same frequency and with the same predetermined duty cycle α, as shown in the diagram of FIG. 6B. No allowance is made in this figure for the response time of the light sources, which may be considered negligible.

If it were desirable for the response times of the light sources to be shown in FIG. 6B, this would mean that the "switchover" of the illumination E from one state to the other would show a delay with respect to the power P supplied to these light sources, shown in FIG. 6A.

It should be noted that the duty cycle α is determined by the ratio between the duration $t_1$ for which the electrical power is maximal and the duration T of the period, and therefore varies from 0 to 100%:

$$\alpha = \frac{t_1}{T}$$

A diode of the LED or laser type reacts practically instantaneously to a variation in the electrical power supplied to it. Consequently, the illumination emitted by the light sources of the headlights 22 varies with the same duty cycle α.

If the minimum value $P_{min}$ of the power supplied to the light sources is zero, the minimum illumination $E_{min}$ is also equal to zero. In these conditions, the mean illumination $\overline{E}$ emitted by the light sources supplied in PWM mode with a duty cycle α is equal to:

$$\overline{E} = \alpha \cdot E_{MAX}$$

To ensure that the illumination of the road scene SR conforms to the regulations, therefore, it is simply necessary for the mean illumination provided by the light sources supplied in PWM mode to be equal to the illumination $E_{REG}$ that they would have to emit in continuous conditions to provide this illumination according to the regulations, i.e.:

$$E_{MAX} = \frac{1}{\alpha} \cdot E_{REG}$$

Given the characteristics of the LED or laser diodes used, it is easy to deduce from these the electrical power $P_{REG}$ required to supply the diodes so that they provide the desired illumination $E_{MAX}$ for the time $t_1$ at the frequency $1/T$.

This frequency $1/T$ is chosen to be high enough to prevent any scintillation phenomenon, both for the driver 24 of the vehicle 20 and for the drivers of other vehicles which are approaching or being followed. The frequency $1/T$ will be, for example, greater than 100 Hz, to benefit fully from the phenomenon of persistence of vision.

Thus the illumination of the road scene SR by the headlights 22 will be perceived, by the driver 24 of the vehicle 20 and by the other drivers, as though it were conventional continuous illumination.

However, according to the invention, the driver 24 of the vehicle 20 observes this road scene through a screen with a variable coefficient of transmission, which may be the windshield 26, the screen F or glasses 28, whose coefficient of transmission is variable with the same frequency as that of the operation of the headlights 22 and the same duty cycle, as shown by the diagram of FIG. 6C.

The windshield 26, the variable-transmission screen F or the glasses 28 thus have a coefficient of transmission CT which varies between:
 a maximum value $CT_{MAX}$, for which the transparency is maximal during the time $t_1$, and
 a minimum value $CT_{min}$, for which the transparency is minimal during the time $t_2$,
as shown in FIG. 6C.

Figure 7:
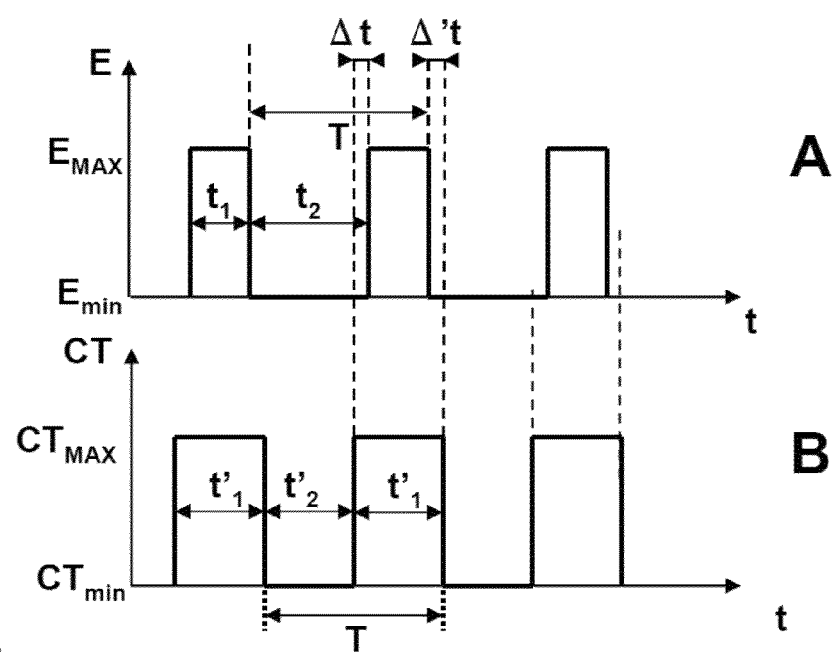

Preferably, as shown in FIG. 7, the duration $t'_1$ for which the coefficient of transmission has its maximum value $CT_{MAX}$ is greater than the duration $t_1$ for which the illumination has its maximum value $E_{MAX}$, so that it starts an instant $\Delta t$ before $t_1$ and ends an instant $\Delta' t$ after $t_1$. Because of this variant embodiment, it is possible to ensure that:
 when the light source 22 switches to its maximum illumination state $E_{MAX}$, the coefficient of transmission CT already has its maximum value $CT_{MAX}$, and that
 when the coefficient of transmission CT switches to its minimum value $CT_{min}$, the light source 22 has already switched to its minimum illumination state $E_{min}$ However, it is possible to arrange matters so that the offset $\Delta t$ between the illumination E and the coefficient of transmission CT is in the other direction, that is to say that:
 when the coefficient of transmission CT switches to its maximum value $CT_{MAX}$, the light source 22 is already in its maximum illumination state $E_{MAX}$, and that when the light source 22 switches to its minimum illumination state $E_{min}$, the coefficient of transmission CT has already switched to its minimum value $CT_{min}$.

The value of the offset $\Delta t$ or $\Delta' t$ is small relative to the durations $t_1$ or $t_2$, regardless of whether this offset $\Delta t$ or $\Delta' t$ is located before the start of $t_1$ or of $t_2$, or before the end of $t_1$ or of $t_2$. In all the examples considered, it may therefore be said that the illumination (E) reaches its maximum value ($E_{MAX}$) substantially when the coefficient of transmission (CT) of the screen (26, F, 28) reaches its maximum value ($CT_{MAX}$).

In other words, the first variant described above (CT becomes equal to $CT_{MAX}$ when the source 22 has already reached $E_{MAX}$, and the light source 22 switches to $E_{min}$ when CT is already equal to $CT_{min}$) makes it possible to ensure that the coefficient of transmission will have its maximum value $CT_{MAX}$ for the whole of the duration for which the light source 22 is in its maximum illumination state $E_{MAX}$, and therefore that the driver 24 will have an optimal view of the road scene as it is illuminated by the light source 22.

The value $CT_{MAX}$ is the value for which the screen F with variable coefficient of transmission or the glasses lenses 28 have their maximum transparency. In most cases, liquid crystal screens, as well as microelectromechanical systems, have this state in the absence of any electrical excitation, in other words in the rest state, and are opaque only under the effect of an electric field. In these cases, the value $CT_{MAX}$ corresponds to a minimum excitation of the liquid crystals or microelectromechanical systems forming the screen F with a variable coefficient of transmission or the glasses lenses 28.

In some cases, the rest state of a screen F with a variable coefficient of transmission may be that in which they have their maximum opacity, becoming transparent only under the effect of an electric field. In this eventuality, the value $CT_{MAX}$ corresponds to a maximum excitation of the screens with a variable coefficient of transmission forming the glasses lenses 28.

The above explanations are applicable, mutatis mutandis, to the value $CT_{min}$ of the coefficient of transmission of the glasses lenses 28.

Thus the diagram of FIG. 6C show the variation of the coefficient of transmission CT of the glasses lenses 28, rather than the variation of the excitation signal of these glasses lenses 28.

Preferably, the minimum value $CT_{min}$ of the coefficient of transmission CT is substantially zero during the time $t_2$, or, in other words, the variable-transmission screen F is substantially opaque during the time $t_2$.

In these conditions, assuming that the glasses 28 form the variable-transmission screen used,
 the glasses 28 are opaque during the time $t_2$, that is to say while the light sources of the headlights 22 are switched off, and
 the transparency of the glasses 28 is maximal during the time $t_1$, that is to say while the light sources of the headlights 22 are illuminating the road scene SR with the maximum intensity.

The driver 24 therefore has the impression of seeing the road scene SR as if it were illuminated by conventional headlights providing continuous illumination.

However, owing to the present invention, and as shown in FIG. 2, the driver 24 sees, during the time $t_1$ when the glasses 28 have their maximum transparency:
 all the passive elements illuminated by the low beam 42 in the road scene SR, such as the road 10 and the shoulders 12,
 all the semi-active elements in this beam 42 which receive the light from the headlights 22 and back-reflect it toward the vehicle 20 and the driver 24, such as the traffic signs 14 and the reflectors 19 of the followed vehicles, and all the active elements, such as the headlights 18 of approaching vehicles.

During the time $t_2$, the glasses 28 are opaque, and the driver 24 therefore sees nothing of the road scene SR.

Since the times $t_1$ and $t_2$ follow each other at the frequency 1/t of about 100 Hz, the driver's eye 24 performs an integration of his observations, yielding the following results.

The passive elements are illuminated periodically during the times $t_1$,
at the frequency 1/T,
with a duty cycle α,
with an illumination $$E_{MAX} = \frac{1}{\alpha} \cdot E_{REG}.$$

The mean of the successive observations of the passive elements is therefore equal to the observation which would be made with a constant illumination $E_{REG}$. Therefore the driver 24 has a view of the passive elements which is no different from that provided by conventional illumination.

The semi-active elements are illuminated in the same conditions as the passive elements, and they reflect a considerable part of the light they receive approximately in the direction from which it comes. For example, if the duty cycle α is equal to 50%, they will receive a quantity of light $Q_2$ twice as great as the quantity according to the regulations $Q_{REG}$, during a time that is half as long. They will therefore reflect as much light as if they had been continuously illuminated with the quantity according to the regulations $Q_{REG}$.

The mean of the successive observations of the semi-active elements is therefore equal to the observation which would be made with constant illumination $E_{REG}$. Therefore the driver 24 has a view of the semi-active elements which is no different from that provided by conventional illumination.

The active elements receive a quantity of light which is entirely negligible relative to the quantity emitted by them. However, they can only be observed by the driver 24 during the time t1, during which the variable-transmission screen F provides its maximum transmission.

Therefore the active elements are visible only during a fraction of time equal to the duty cycle α. Their apparent brightness through the variable-transmission screen F is therefore decreased relative to their actual brightness by a factor α.

The desired result is therefore achieved: with reference to FIG. 2, all the passive and semi-active elements located in the low beam 42 are visible in the same conditions as in the case of conventional illumination. However, all the active elements, such as the headlights 18 of the approaching vehicles, are observed with a brightness decreased by a factor α.

This is indeed the phenomenon that is observed, shown in FIGS. 4A and 4B.

FIG. 4A shows a conventional road scene SR, in which the road 10, the elements 12 external to the road, the traffic signs 14 and the headlights of the approaching vehicles 18 can be seen.

FIG. 4B shows the same road scene SR, observed through the variable-transmission screen F of the invention. Evidently, all the elements of this road scene SR are visible in the same conditions as in FIG. 4A, regardless of whether they are passive or semi-active elements such as traffic signs, with the exception of active elements such as the headlights 18 of approaching vehicles, the brightness of which has been reduced.

Because of the invention, it is possible, by varying the duty cycle α, to maintain a constant visibility of the passive and semi-active elements, and to provide a desired reduction in the brightness of the active elements present in the road scene SR. Even if the headlights of approaching vehicles 18 are dazzling, the invention enables their brightness to be reduced until they are less dazzling, without modifying the perception of the other details of the road scene SR.

The invention has numerous additional advantages, in the embodiment in the form of glasses 28 worn by the driver 24. This is because, as shown in FIG. 5, the driver's 24 field of view includes, in addition to the road scene SR before him through the windshield 26, the dashboard of the vehicle 20 which shows various visual displays useful to the driver 24.

These visual displays may be dials 44 of speedometers or revolution counters, or indicator lights 46 indicating the operation of certain items of equipment of the vehicle 20. The dials 44 and the indicator lights 46 are switched on when the headlights 22 are switched on, and provide illuminated visual displays.

Other illuminated visual displays 48 may be presented to the driver 24 outside the dashboard, for example as shown in FIG. 5, by a viewing system known in English as a "head up display" (HUD), forming a virtual image with the aid of the windshield 26.

Since these various illuminated visual displays provided for the driver's 24 attention are intrinsically important for safety, the driver 24 needs to have the clearest possible view of them. The invention also enables this result to be obtained, by providing for the switching on of these visual displays to be synchronized with the variation of the coefficient of transmission of the variable-transmission screen F, in this case the glasses 28.

According to the invention, the brightness of the visual displays 44, 46 and/or 48 is increased by a factor equal to the inverse of duty cycle a during the time $t_1$. Thus the variable-transmission screen F has the effect of weakening the brightness of all the objects located in the driver's 24 field of view, with the exception of:

the road scene SR illuminated by his own headlights,
the visual displays, the dashboard or the head up display system.

Another potential source of inconvenience for the driver 24 is the interior lighting system of the vehicle 20, when for example one or more passengers wish to use it in order to read. The use of the ceiling light 50, as shown symbolically in FIG. 1, may disturb the driver 24 by illuminating details in his field of view which may distract his attention.

The present invention also enables this problem to be overcome. This is because the invention may provide for the interior lighting 50 to be switched on only during the times $t_2$, that is to say during the periods when the variable-transmission screen F, in this case the glasses 28, is opaque. The fact that the interior lighting is switched on is then not perceived by the driver 24, whereas the passengers may use the lighting as they wish.

Thus a method and a device for assisting the nighttime driving of a motor vehicle 20 has indeed been devised, enabling a driver 24 of a vehicle 20 to have the following elements in his field of view:

all the passive and semi-active elements illuminated in the road scene SR by the low beam emitted by the headlights of his vehicle 20, with a luminous intensity equal to that which is customary for him.

all the active elements, with a reduced luminous intensity, the reduction being fixed or variable by changing the common duty cycle of his headlights and of his variable-transmission screen F, and all the visual displays relating to the nighttime driving of the vehicle 20, also with a luminous intensity equal to that which is customary for him.

Clearly, the present invention is not limited to the embodiments which have been described; in fact, persons skilled in the art may make numerous modifications to the invention, all of which fall within its scope. Thus, for example, two successive variable-transmission screens may be provided, for example the windshield 26 and a movable screen F of the sun visor type, to provide specific regions of the driver's field of view with different attenuations.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for assisting the nighttime driving of a motor vehicle, the vehicle being fitted with at least one lighting device for emitting a beam for the illumination of the road scene (S) in front of the vehicle in accordance with regulations,
    an illumination (E) emitted by said at least one lighting device being variable between a maximum value ($E_{MAX}$) and a minimum value ($E_{min}$);
    the device including at least one variable-transmission screen placed between the road scene (S) and a driver of the vehicle;
    a coefficient of transmission (CT) of said at least one variable-transmission screen being variable between a maximum value ($CT_{MAX}$) and a minimum value ($CT_{min}$);
    a switching on of at least one light source of said at least one lighting device and said coefficient of transmission (CT) of said at least one variable-transmission screen being controlled by a control unit in synchronization;
    said illumination (E) reaching its maximum value ($E_{MAX}$) substantially when said coefficient of transmission (CT) of said at least one variable-transmission screen reaches its maximum value ($CT_{MAX}$);
    wherein said control unit controls a circuit for regulating a power supply to said at least one light source of said at least one lighting device and a transmitter of remote control waves (OT) directed toward a receiver.

2. The device as claimed in claim 1, wherein said coefficient of transmission (CT) of said at least one variable-transmission screen is controlled by said receiver receiving said remote control waves transmitted by said transmitter of said remote control waves (OT).

3. The device as claimed in claim 1 wherein said at least one variable-transmission screen is formed by:
    a windshield of said vehicle,
    screen (F) placed between said windshield of said vehicle and said driver of said vehicle, or
    glasses worn by said driver of said vehicle.

4. The device as claimed in claim 1, wherein said control unit controls:
    said circuit for regulating said power supply to said at least one light source of said at least one lighting device, and
    said transmitter of said remote control waves (OT) directed toward said receiver,
    in such a way that variations of said illumination (E) emitted by said at least one lighting device and of said coefficient of transmission (CT) of said at least one variable-transmission screen are synchronized, and reach their maximum values ($E_{MAX}$, $CT_{MAX}$) at the same time.

5. The device as claimed in claim 1, wherein said control unit controls:
    said circuit for regulating said power supply to said at least one light source of said at least one lighting device, and
    said transmitter of said remote control waves (OT) directed toward said receiver,
    in such a way that a duration ($t'_1$) for which said coefficient of transmission has its maximum value ($CT_{MAX}$) is greater than a duration ($t_1$) for which said illumination has its maximum value ($E_{MAX}$).

6. The device as claimed in claim 1, wherein said illumination (E) emitted by said at least one lighting device and said coefficient of transmission (CT) of said at least one variable-transmission screen (F) are variable according to a pulse width modulation (PWM) mode.

7. The device as claimed in claim 6, wherein said minimum value ($E_{min}$) of said illumination (E) is zero.

8. The device as claimed in claim 6 wherein said minimum value ($CT_{min}$) of said coefficient of transmission (CT) of said at least one variable-transmission screen (F) is substantially zero.

9. The device as claimed in claim 1, wherein said transmitter of said remote control waves (OT) and said receiver of said remote control waves (OT) communicate by means of radio, infrared or ultrasonic waves.

10. The device as claimed in claim 9, wherein said transmitter of said remote control waves (OT) and said receiver of said remote control waves (OT) communicate according to a wireless communication protocol.

11. The device as claimed in claim 1, wherein said at least one light source of said at least one lighting device is a light-emitting diode or a laser diode, said at least one light source being supplied with power by said regulating circuit, and receiving electrical power (P) which varies periodically between a maximum ($P_{MAX}$) and a minimum ($P_{min}$) value.

12. The device as claimed in characterized in that the claim 11, wherein said electrical power (P) is variable according to a pulse width modulation mode.

13. The device as claimed in claim 1, wherein said at least one variable-transmission screen is formed by a liquid crystal screen.

14. The device as claimed in claim 1, wherein said at least one variable-transmission screen (F) is formed by a microelectromechanical system.

15. The device as claimed in claim 13, wherein said at least one variable-transmission screen is associated with a stand-alone electrical power supply.

16. The device as claimed in claim 1, wherein said coefficient of transmission (CT) of said at least one variable-transmission screen (F) is controlled in synchronization with luminous visual displays presented by a vehicle dashboard and relating to an operation or an environment of said vehicle.

17. The device as claimed in claim 16, wherein the brightness of said luminous visual displays is increased by a factor equal to an inverse of a duty cycle ($\alpha$) of a pulse width modulation (PWM) mode when said coefficient of transmission (CT) of said at least one variable-transmission screen (F) is at its maximum value ($CT_{MAX}$).

18. The device as claimed in claim 1, wherein said coefficient of transmission (CT) of said at least one variable-transmission screen (F) is controlled in synchronization with an interior lighting of said vehicle, said interior lighting being switched on only when said coefficient of transmission (CT) of said at least one variable-transmission screen is at its minimum value ($CT_{min}$).

19. A variable-transmission screen (F) adapted to be placed between a driver of a motor vehicle and a road scene (SR) in front of said vehicle wherein a coefficient of transmission (CT) of said variable-transmission screen (F) is variable according to a pulse width modulation (PWM) mode between a maximum value ($CT_{MAX}$) and a minimum value ($CT_{min}$), said coefficient of transmission (CT) of said variable-transmission screen (F) being controlled by a control unit according to a wireless communication protocol, by means of remote control waves (OT) transmitted by a transmitter of said control unit and received by a receiver.

20. The device as claimed in claim 1, wherein said variable-transmission screen (F) has a transparency during a time $t_1$, and an opaqueness during time $t_2$, said times $t_1$ and $t_2$ to follow each other at a frequency of about 100 Hz or more.

* * * * *

UNITED STATES PATENT AND TRADEMARK OFFICE
CERTIFICATE OF CORRECTION

PATENT NO. : 9,079,532 B2
APPLICATION NO. : 14/385646
DATED : July 14, 2015
INVENTOR(S) : Benoist Fleury Page 1 of 1

It is certified that error appears in the above-identified patent and that said Letters Patent is hereby corrected as shown below:

In the specification

Column 1, line 21, after "Description" insert -- of --.

In the claims

Claim 3, Column 13, line 59, before "screen" insert -- a --.

Claim 12, Column 14, line 41, after "in" please delete "characterized in that the".

Signed and Sealed this
First Day of December, 2015

Michelle K. Lee
*Director of the United States Patent and Trademark Office*